Feb. 17, 1931.   W. A. RICHARDS ET AL   1,792,606
METHOD AND APPARATUS FOR DETERMINING THICKNESS OF METAL COATINGS
Filed Jan. 14, 1930
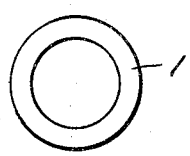
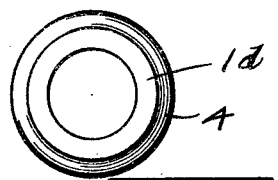
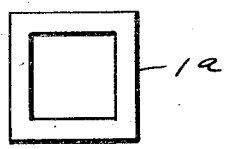
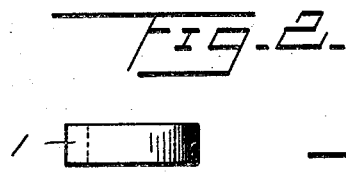
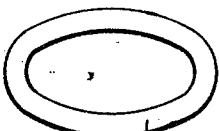
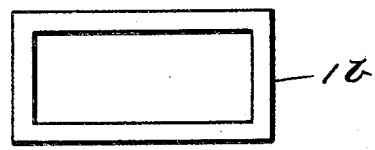
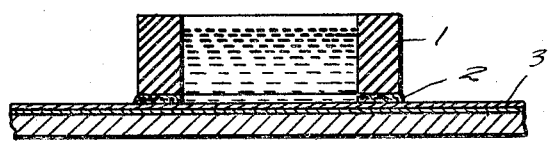
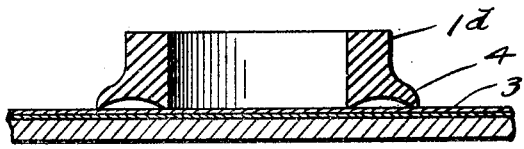
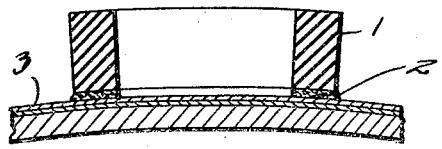
Inventor
W. A. Richards
P. H. Kramer
By Watson E. Coleman Patented Feb. 17, 1931

1,792,606

UNITED STATES PATENT OFFICE

WESLEY A. RICHARDS AND PAUL H. KRAMER, OF DETROIT, MICHIGAN

METHOD AND APPARATUS FOR DETERMINING THICKNESS OF METAL COATINGS

Application filed January 14, 1930. Serial No. 420,791.

This invention relates to a method of determining the thickness (or weight) of certain metal coatings of radiator shells, headlights, running board moldings, percolators, cans and the like. Determinations of this character are now made by stripping the coating from a definite area of the specimen and analyzing the removed portion of the coating, or by ascertaining the loss in weight due to the removal of the coating by stripping or otherwise from the specimen, or by making a microscopic examination of a section of the specimen, or by some form of arbitrary test such as the Preece test, or by measuring the hydrogen evolved from a definite area of the coating as followed in practicing the Cushman test.

These methods are objectionable in that they require considerable time, can only be practiced by highly trained chemists, and require the use of expensive apparatus. Furthermore, with the exception of the Cushman method, they are not adapted to the determination of coatings in situ, nor do they serve to show up differences in coating thickness on closely adjacent areas of the specimens. While the Cushman method permits the determinations of coatings in situ and may be employed to show up differences in coating thickness on closely adjacent areas of the specimens, it is objectionable in that it requires the collection and measurement of a volume of hydrogen evolved from the coating and can only be practiced by a highly trained chemist and with the aid of expensive apparatus.

Our invention has for one of its objects to overcome the stated objections to the methods now employed, and comprehends a method capable of permitting a determination to be made in a comparatively short time, by an untrained person and with the use of simple and inexpensive apparatus, it being possible in practicing our method to make a test in two minutes, to make as many as ten tests in from fifteen to twenty minutes on adjacent areas of the same specimen, and to make tests on specimens having flat or curved or irregular surfaces and without cutting or otherwise mutilating the specimens in any way.

Our invention further comprehends a method which consists in liberating, from a definite area of a coating and in the presence of an indicator solution, hydrogen, and the salt of the metal coating in a state of reduced valence, both being present in amount proportional to the thickness of the coating, the reduced metal salt thus liberated acting on the indicator solution in a manner to enable the amount thereof to be visually detected and the thickness of the coating to be thus determined.

Our invention further comprehends a method which includes the step of isolating the definite area of the coating to be tested by a flexible member adapted to form a relatively inert wall around the area and establish an acid-proof connection between itself and the coating.

Our method is hereinafter more fully described and claimed and a part of the apparatus necessary to practice the same is disclosed in the accompanying drawing, wherein:—

Figure 1 is a top plan view of one form of area isolating member employed in practicing our method;

Figure 2 is a view in side elevation of the member;

Figure 3 is a sectional view illustrating the application of the member to a flat surface;

Figure 4 is a similar view illustrating the application of the member to the curved surface;

Figure 5 is a top plan view of a further form of the member;

Figure 6 is a top plan view of a still further form of the member;

Figure 7 is a sectional view illustrating the application of the member shown in Figure 6;

Figure 8 is a top plan view of a further form of the member, and

Figure 9 is a top plan view of a still further form of the member.

We have found that if a coating of a metal such as chromium or tin be subjected to the action of an acid of a non-oxidizing nature, such as hydrochloric acid, nascent hydrogen will be evolved, and the metal coating will be converted into the salt of lowest valence.

For example:—

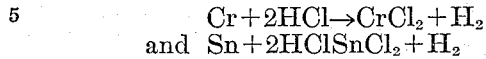

If an oxidizing agent be incorporated in this acid, such agent being of suitable nature, such as a solution of iodine in potassium iodide, a reaction will take place, whereby the oxidizing agent is reduced and the metallic salt oxidized to a higher valence.

For example:—

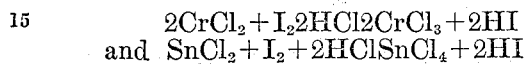

As is well known to those trained in the art of analytical chemistry, if the above reactions take place in the presence of a small amount of starch solution, we will have a definite and sharp color indication of the presence of iodine, the color being a dark blue with free iodine, and colorless in the presence of reduced iodine, or hydrogen iodide.

Consequently, it will be evident that a visual means may be thus provided for informing the observer when the amount of oxidizing agent (iodine) is present in excess of the reduced metal salt, and also when the reduced metal salt is present in excess of the iodine.

We have found that the above reactions are, or can be made to be quantitative, and our findings in this respect may be substantiated by reference to chemical literature.

We give the following explanation of quantitative behavior as applied to a chromium coating. We proceed with the test by isolating a definite area of the surface to be tested in a manner that will be explained later.

For example:—

If we are dealing with a chromium coating .00002 inches in thickness (.0115 oz. per square foot,) and our test is made on an isolated area of .37 square inches, it is evident that .00084 grams of chromium are present in the test area. This amount of chromium will combine with the hydrochloric acid to form a proportionate amount of divalent chromium chloride, which in turn will be oxidized by a definite amount of iodine to form tri-valent chromium chloride. As an example, we find that an amount of iodine solution equivalent to .167 cubic centimeters of a tenth normal solution are required for the reaction when the thickness of chromium under the test piece is .00002 inches, and, for greater or lesser thicknesses (weights) the amounts of iodine will be proportionally greater or lesser. As we desire for our purpose to have our iodine of such concentration that it may be easily and accurately measured or pipetted, and .167 cc. is too small a volume to conveniently handle, we prefer to use twice the amount of twentieth normal, or in some instances four times the amount of fortieth normal iodine.

In an analogous manner, if, for example we are dealing with a coating of tin, of a weight equivalent to .10 oz. per square foot, we will have .00728 grams of tin in our isolated area (.37 square inches) and 1.23 cc. of tenth normal iodine will be required for this reaction, or as we prefer to use in this case, .615 cc. of fifth normal iodine.

It is to be understood that the above values are theoretical, and while we find them to be in close agreement with those obtained in practice, we prefer to determine the amounts of iodine required by standardizing the same against predetermined thicknesses (weights) of coatings.

We will now describe in detail how we apply the above reactions and findings to our invention. We will explain this for chromium coatings, and the application will be analogous and evident to one skilled in the art, when the same procedure is applied to tin coatings. We isolate a definite area of surface of the article on which the determination is to be made. This is done by using a flexible ring 1 which by preference is made of rubber and may, for example, be eleven-sixteenths of an inch in inside diameter, one inch in outside diameter and five-sixteenths of an inch in height or thickness. The ring 1 has a flat lower side, and such side is provided with a coating of water-proof grease 2, such as petrolatum or lanolin. The ring 1 is applied with its greased lower side in contact with the surface 3 to be tested, the grease establishing an acid-proof seal between the ring and surface, and the ring forming a relatively inert wall around a definite area of the surface.

We now place a drop of starch indicator solution on the spot enclosed by the test ring, then add, by means of a graduated pipette a measured amount of the iodine solution previously described, selecting an amount that is equivalent to a certain coating thickness (weight). For example, we select an amount equivalent to a thickness of .00002 inches. We next add concentrated hydrochloric acid in amount of .5 cc. or greater, as the amount added is immaterial, so that it be in excess, and does not overflow the test ring. The color at this instant is dark blue. The reaction takes place immediately and is complete in about one minute. If the color has not changed and the blue remains, the coating is less than .00002 inches thick. If the coating is greater than .00002 inches thick, the test spot becomes colorless. If the color remains, another test is made on an adjacent area, this time an amount of the iodine solution corresponding to .000015 is used. Now, for example, if the coating were .000018 thick, we would find the latter test spot had turned colorless, and we would have determined our thickness to be between .00002 and .000015 inches. Using smaller increments of the iodine solution, we have found this reaction to be sensitive to thickness variations of .000001 inches, but in practice, this accuracy is seldom required.

It is customary in many industries to specify the minimum thickness desired, and where such is the case, it is only necessary to observe the color change formed when using an iodine solution corresponding to that thickness.

It will be evident to chemists that if the metal underlying the coating to be measured is such that it will react with the acid to likewise form a reducing compound that will reduce the iodine solution, the results will be at variance. As chromium coatings of the class we wish to measure are deposited over nickel undercoatings, and hydrochloric acid is relatively inert toward nickel as here used, this condition does not enter. Also in the case of tin plate over sheet steel or iron, the ferrous chloride formed is without action on the iodine solution. But, if it is so desired, an addition of antimony chloride may be made to the acid, which will prevent any action whatsoever. The action of hydrochloric acid on tin plate is slow, therefore we prefer to speed up the reaction by adding a small amount of platinic chloride to our acid. This is catalytic in action and has no other effect on the reactions here noted. We lay no claim to invention as regarding the use of antimony chloride or platinic chloride for the purposes here given. Such use is common chemical knowledge. By use of our invention, a great many determinations may be made in a short time, and minute variations of thickness on the same article be determined.

For purposes of experimentation, we have confined our description to the determination of coatings applied to flat surfaces, and to the use of an area isolating member of annular contour. It is to be understood, however, that our method may be used for determining the thickness of coatings on curved surfaces, and narrow strips, and that the area isolating member may be square, as shown at 1ª in Figure 8 or of elongated rectangular formation, as shown at 1ᵇ in Figure 5 or of elliptical formation, as shown at 1ᶜ in Figure 9 or of any other desired shape. The shape of the area isolating member is immaterial, it only being necessary that the member be capable of isolating the desired area from the remainder of the coating to be tested.

Also the sealing of the area isolating member to the surface may be accomplished in other ways than the one set forth, as for example, a lacquer composition could be used, or a rubber cement, or the member may be so cupped as to use the force of suction to hold it to the surface to be tested, as shown in Figures 6 and 7 wherein 1ᵈ designates the member and 4 the cupped lower side thereof. The member itself could be of other composition than rubber, so that it be relatively inert to the reaction herein described. Furthermore, the enclosed area may be greater or less than that herein described, provided that the amount of iodine used be standardized for reaction on the area selected.

We prefer to measure the iodine solution by means of a pipette or burette so graduated that the divisions thereon will correspond to certain thicknesses (weights) of coatings. We also claim the use of other means of adding definite amounts of iodine solution. For example, several solutions could be made of different normalities, so that the addition of a definite amount of each would correspond to certain thicknesses (weights) of coatings. It would also be within the conception of our invention to add the iodine solution dropwise, so that a certain number of drops would represent certain thicknesses (weights) of coatings.

It is also evident that an excess of the iodine solution could be employed, and after the reaction had taken place, this excess be determined by use of a standardized reducing agent, such as sodium thiosulphate, and the amount of iodine solution used, so computed.

Another variation of our method would be to liberate the salt of the metallic coating with hydrochloric acid, but without the iodine and, after this reaction, to add the starch indicator and then the standard iodine solution until a color change occurs. The amount of standard iodine added could then be computed in terms of coating thickness (weight). However, we find this procedure to be subject to errors due to atmospheric oxidation, and means must be provided to obviate the errors thus introduced.

We have found that concentrated hydrochloric acid (37% HCl) is suitable for use in this invention for the purposes as previously described, but we do not limit ourselves to the use of any particular concentration of this acid, neither do we limit ourselves to the use of this acid solely, for mixtures of hydrochloric acid with sulphuric or phosphoric or hydrofluoric acid may also be made to serve the purpose before described.

We claim:—

1. The method of determining the thickness (weight) of certain metallic coatings, particularly tin and chromium, which consists in liberating the coating by a stripping acid, so that the salt of said coating will be in a reduced condition, with means incorporated in the reaction reagent for measuring the reduced salt.

2. The method of determining the thickness (weight) of chromium and tin coatings which consists in applying a suitable acid to an isolated portion of the coating together with a standardized amount of oxidizing agent, and a chemical indicator, the chemical reaction resulting in a quantitative measurement of the underlying coating, which is visually evident.

3. Apparatus for determining the thickness (weight) of certain metallic coatings in situ, comprising a receptacle for enclosing a definite area, and means for attaching same to surface, the receptacle being adapted to hold a chemical reacting composition for the purpose herein described.

4. The method of determining the thickness (weight) of a chromium or tin coating which consists in liberating from a definite area of the coating an amount of hydrogen directly proportional to the thickness of the coating, together with the salt of said coating in lowest valence, and in combining with the hydrogen and metallic salt thus liberated a composition capable of being differently affected by different amounts of hydrogen and metallic salt and visually disclosing such effects.

5. The method of determining the thickness (weight) of a chromium or tin coating in situ, which consists in liberating from a definite area of the coating, hydrogen, together with the salt of said coating in lowest valance, both being proportional to the thickness of the coating, and in combining with the hydrogen and reduced metal salt a composition capable of being differently affected by different amounts of reduced metal salt and visually disclosing such effects.

6. The method of determining the thickness (weight) of a chromium or tin coating in situ, which consists in isolating a definite area of the coating, in liberating from such area of the coating, hydrogen, and the salt of the metal coating in reduced valence, both being present in amount directly proportional to the thickness of the coating, and in combining with the hydrogen and reduced metal salt a composition capable of being differently affected by different amounts of reduced metal salt and visually disclosing such effects.

In testimony whereof we hereunto affix our signatures.

WESLEY A. RICHARDS.
PAUL H. KRAMER.